[125.]

Eminel P. Halsted's
Imp<sup>d</sup> Cutter Head

No. 118,931.    Patented Sep. 12, 1871.

Witnesses.
Thos. H. Dodge
A. E. Peirce

Inventor.
Eminel P. Halsted

UNITED STATES PATENT OFFICE.

EMINEL P. HALSTED, OF WORCESTER, MASSACHUSETTS, ASSIGNOR TO R. BALL & CO., OF SAME PLACE.

IMPROVEMENT IN CUTTER-HEADS FOR WOOD-WORKING MACHINES.

Specification forming part of Letters Patent No. 118,931, dated September 12, 1871.

*To all whom it may concern:*

Be it known that I, EMINEL P. HALSTED, of the city and county of Worcester and Commonwealth of Massachusetts, have invented certain new and useful Improvements in Cutter-Heads for Wood-Working Machines; and I do hereby declare the following to be a full, clear, and exact description of the same, reference being had to the accompanying drawing, in which—

Figure 1:
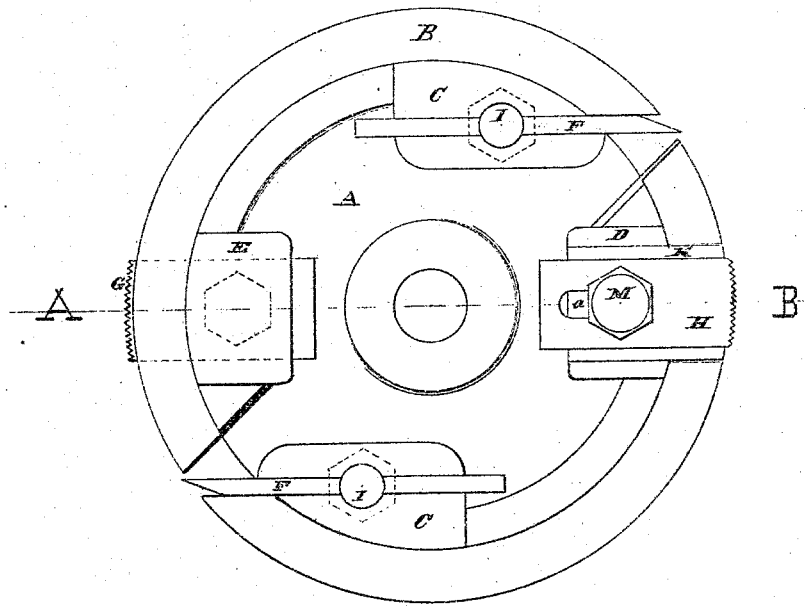
Figure 2:
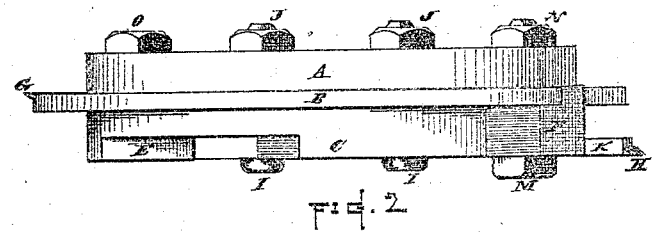
Figure 3:
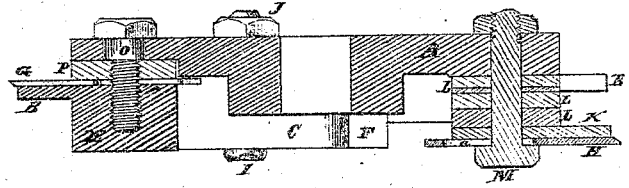

Figure 1 represents a side view of my improved cutter-head. Fig. 2 represents a top view of the same, and Fig. 3 represents a central section at line A B, Fig. 1.

To enable those skilled in the art to which my invention belongs to make and use the same, I will proceed to describe it more in detail.

The nature of my invention consists in certain improvements in cutter-heads for wood-working machines, as hereinafter described.

In the drawing the parts marked A represent the circular metallic disk of the head, which is furnished with a central eye and hub, and is to be secured to the revolving arbor or spindle upon the machine whereon the head is used. The disk A is provided with an annular flange, B, around its circumference, and with lugs or bosses C C D and E upon one of its sides for supporting and retaining the various cutters F F G and H, which are arranged in the several positions indicated in the drawing. The cutters G and H are made in the form of saw-spurs, and are for cutting down the sides of the groove or dads, while the cutters F are made in chisel form for removing the wood across the central portion of the groove. The chisel-cutters F F are arranged in grooves formed through the bosses C C and flange B, in the manner shown, and they are held in position by means of slotted bolts I, through which the cutters pass, and whereby they are firmly clamped against the bottom of the grooves, when the holding-nuts J J upon the ends of said bolts I are turned up against the opposite side of the disk A. The cutters F are thus supported throughout their length by the bosses and flange, so that they are not liable to become bent or broken when in use. The flange B is cut away in front of the cutters F to facilitate the free discharge of the chips and shavings. The cutter or saw-spur H is fitted into the side of a holder, K, which consists of a metallic plate having a recess in its side in which the saw-spur accurately fits, and by means of which said spur is firmly braced and supported, so that it is not liable to become bent or injured by any shock to which it may be subjected when in use. The holder K extends nearly to the cutting-end of the saw-spur, just enough of the latter being allowed to project beyond the holder to give a free cut and prevent the holder from striking the wood. The boss D is channeled out radially to the width of the holder K, and down to the level of the disk A, cutting away a section of the flange B of the same width. The holder K, with its saw-spur H, is arranged in the channel thus formed, and a series of metallic washers or plates, L, of the proper form, are inserted between the holder K and the bottom of the channel, the whole being secured in position by a bolt, M, which passes through their center and is clamped down by the nut N at the opposite side of the disk A in the manner illustrated. By removing the bolt M and inserting a greater or lesser number of plates, L, between the spur-holder K and disk A, the saw-spur H can be adjusted for cutting different widths of grooves, as desired. The plates L which are removed from beneath the holder should be placed between the cutter-plate H and the head of the holding-bolt M, thus occupying the full length of the bolt, and at the same time preserving the even balance of the head. The opening in the holder K through which the bolt M passes is made to accurately fit said bolt, while the saw-spur plate H is provided with a longitudinal slot, $a$, so that the latter can be adjusted outward, to compensate for the wearing away of its end, while the former always remains in the same relative position. The cutter or saw-spur G is, in this instance, fitted to a suitable space formed in the disk A and flange B beneath the boss E, where it is secured by the screw-bolt O which passes through the parts from the back of the disk A in the manner shown. A bearing plate, P, is arranged against the spur-plate G, which receives the pressure of the bolt O and distributes it equally over the whole surface of the spur-plate G, thus insuring a firm and steady hold. If preferred, the saw-spur G can be provided with a holder, and also be attached to the disk A, by channeling the boss or lug E and arranging the parts in a similar manner to the arrangement of the saw-spur H, except that the plates or washers would require to be placed above instead of beneath the holder. When adjusting the head for cutting grooves of different widths the chisel-cutters F are taken out and replaced with cutters of the desired width, and the saw-spur H is set to the proper position by removing or inserting plates or washers L. The saw-spur G does not require to be changed.

From the foregoing description it will be seen, by those skilled in the use of wood-working machinery, that my cutter-head is simple and durable in its construction and operation, while at the same time it can be very quickly and accurately adjusted to cut grooves of the various widths required upon ordinary work.

Having described my improved cutter-head, what I claim therein as new and of my invention, and desire to secure by Letters Patent, is—

1. The combination of the curved saw-spur cutter H, with the holder or supporting-plate K concentrically arranged therewith, and holding bolt M, substantially as and for the purposes set forth.

2. The disk A, with the bosses C C D E, cutters F F, saw-spurs G H, holder K, plates L, and holding-bolts I I M O, constructed and arranged as shown and described.

Witnesses:     EMINEL P. HALSTED.
THOS. H. DODGE,
A. E. PEIRCE.     (125.)